E. W. BURGESS.
CORN HARVESTER.
APPLICATION FILED OCT. 16, 1915.
1,312,432.
Patented Aug. 5, 1919.
2 SHEETS—SHEET 1.
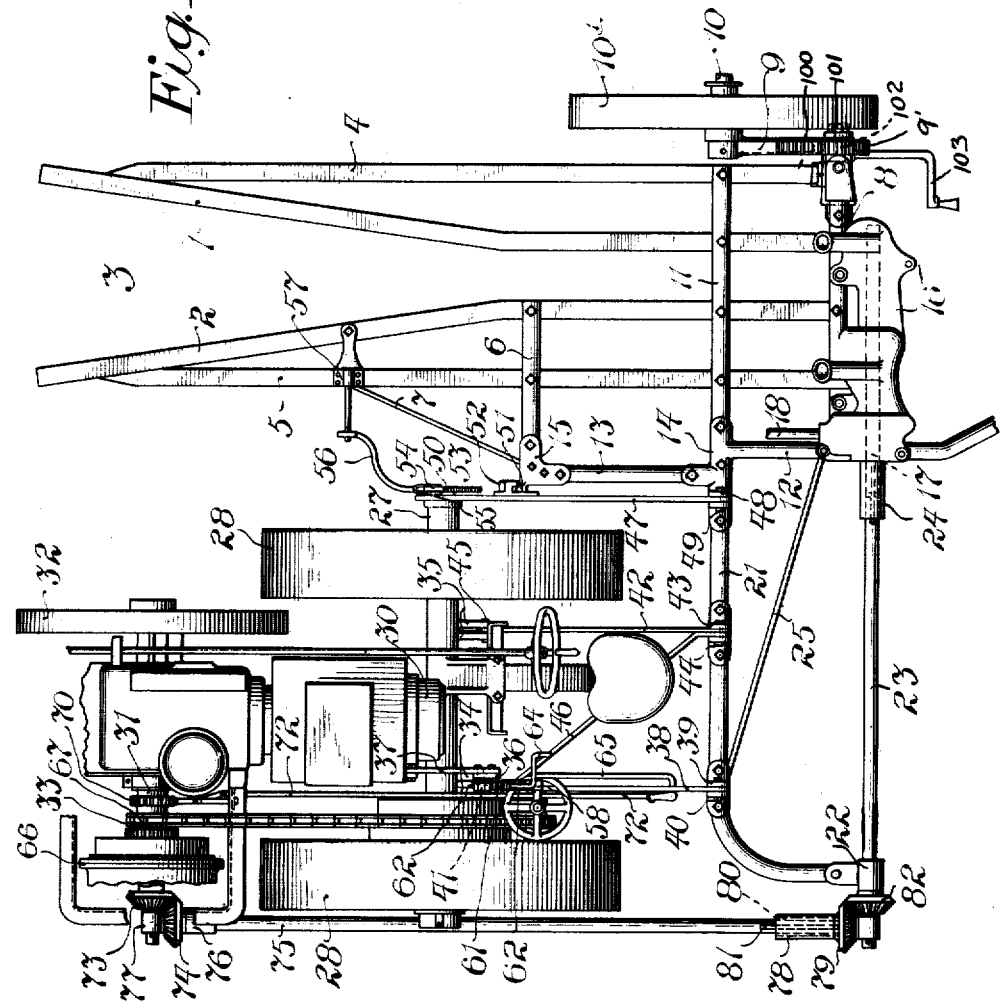
Inventor:
Edward W Burgess.
By Chas. E. Lord
Atty.

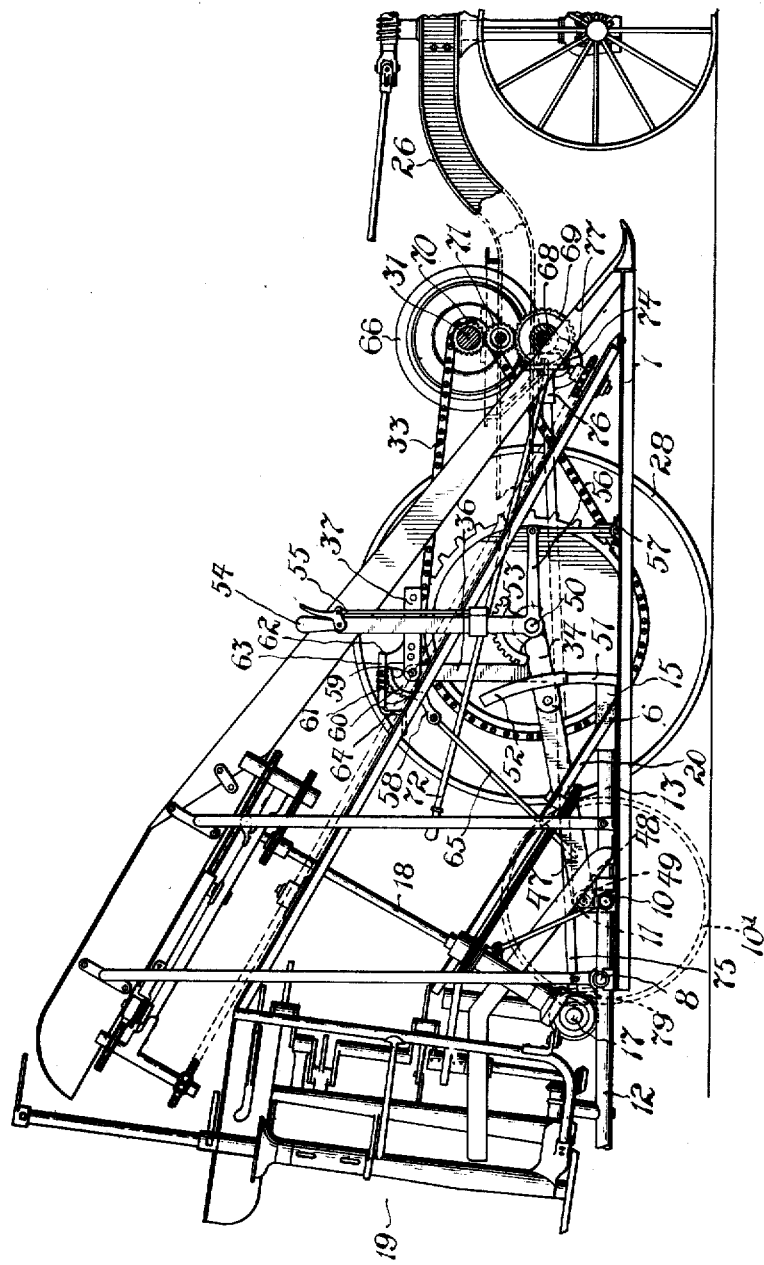

UNITED STATES PATENT OFFICE.

EDWARD W. BURGESS, OF CHICAGO, ILLINOIS, ASSIGNOR, BY MESNE ASSIGNMENTS, TO INTERNATIONAL HARVESTER COMPANY, A CORPORATION OF NEW JERSEY.

CORN-HARVESTER.

1,312,432.   Specification of Letters Patent.   Patented Aug. 5, 1919.

Application filed October 16, 1915. Serial No. 56,298.

*To all whom it may concern:*

Be it known that I, EDWARD W. BURGESS, a citizen of the United States, residing at Chicago, in the county of Cook and State of Illinois, have invented certain new and useful Improvements in Corn-Harvesters, of which the following is a full, clear, and exact specification.

My invention relates to corn harvesters, and to improved means for connecting the frame of the machine to the draft frame of a traction engine whereby it may be raised or lowered or tilted about its axis as desired by the operator from his seat upon the tractor, and to means for transmitting motion from the engine of the tractor to the operative parts of the harvester.

The object of the invention is to provide a machine of the class indicated whereby the traction wheel and tractive driving gears are eliminated and power derived from the traction engine substituted; to provide means whereby the weight heretofore carried by the traction wheel of the machine will be supported by the front frame of the tractor, and means whereby side draft of the machine is effectively resisted by the tractor without affecting the free tilting or raising or lowering thereof.

This object is attained by means of the mechanism illustrated in the accompanying drawings, in which—

Figure 1 is a top plan view of parts of the frame of a corn harvester and traction engine of which my invention forms a part; and Fig. 2 is a side elevation of part of Fig. 1 and including part of the superstructure of a corn harvester.

Referring to the drawings, wherein the same reference characters designate like parts throughout the several views, the frame of the machine is preferably similar to that shown in my Patent No. 727,082, dated May 5, 1903, wherein 1 and 2 represent gathering sills disposed at the right and left of the stalk passage 3. These sills extend forward and are divergent at their front ends to form a flaring receiving throat for the stalks. The gathering sills 1 and 2 are braced laterally by means of supplemental sills 4 and 5, respectively. A transversely disposed tubular frame member 6 is secured to the sills 5 and 2 at the rear end of the flaring throat and extends stubbleward therefrom. A brace member 7 extends from the stubbleward end of the frame member 6 to the sill 5. A transverse frame member 8 extends across the rear ends of the sills 1, 2, 4, and 5 and is secured thereto. It extends grainward of the sill 4, and the grain wheel supporting arm 9 is journaled thereon. The arm is provided with a laterally extending axle member 10 at its front end, upon which is journaled the grain wheel $10^1$. The arm 9 and the adjusting mechanism for the grain wheel are constructed in the manner shown in my Patent No. 728,199, issued May 19, 1903, and therefore these elements are not illustrated in detail in this application. However, referring to Fig. 1, it will be seen that arm 9 is provided with a segmental rack 9' formed concentric with the frame member 8. A spindle 100 is journaled in a sleeve 101 suitably supported on the harvester frame, and said spindle is provided with a worm 102 that engages the rack 9', and is actuated by a crank 103 formed on the rear end of the spindle. With this brief description taken in connection with the showing and description found in my prior Patent, No. 728,199, it is believed that the construction of the adjusting mechanism will be clear. Between the transverse frame members 8 and 6 is a transverse tubular frame member 11 that is secured to the sill members 1, 2, 4, and 5. 12 represents a longitudinally disposed tubular frame member secured to the stubbleward ends of the frame members 8 and 11 and extends in rear of the member 8. 13 represents an intermediate longitudinally disposed tubular frame member extending from the frame member 11 to the frame member 6 and arranged parallel with the member 12. A joint plate 14 receives the meeting ends of the frame members 11, 12, and 13, and is secured thereto. A joint plate 15 is secured to the frame member 6 and receives the front end of the member 13. 16 represents a gear frame secured to the frame members 8 and 12 and having a drive shaft 17 journaled therein that is operatively connected with the cutting mechanism represented by the shaft 18, the automatic binding mechanism 19, and the stalk gathering and forwarding means 20, as shown and described in my Patent No. 727,080, dated May 5, 1903. 21 represents a tubular frame member having its grainward end secured to the joint plate 14 and extending stubblewardly is turned rearwardly, and 22 represents a bearing box secured to the rear end, in which is journaled one end of a transversely disposed shaft 23, having its opposite end detachably received by a coupling member 24 secured to the end of the drive shaft 17. 25 represents a diagonally disposed brace member having one end secured to the stubbleward end of the frame member 21 and its opposite end to the frame member 12.

The tractor includes a truck frame 26, having its rear end carried by an axle 27, having traction wheels 28 mounted upon its opposite ends, a transmission gear mechanism operatively connecting an engine carried by the truck frame and including a cylinder 30, engine shaft 31, and fly wheel 32, with the traction wheels, as by means of a sprocket chain 33. 34 represents a pair of rearwardly extending draft members integral with the truck frame of the tractor and at its left-hand side, and 35 represents a like pair at its right-hand side. 36 represents a vertically disposed L-shaped frame member having its lower end connected with the ear members 34 and its forwardly extending end 37 with a fixed part of the tractor.

A draft frame connects the tractor with the harvester frame and includes a draft bar 38, having its rear end received between ear members 39 secured to the frame member 21 and is pivotally connected therewith by means of a pin 40, and its front end detachably connected with the ear members 34 by means of a pin 41. A draft bar 42 having its rear end received between ear members 43 secured to the frame member 21 and pivotally connected therewith by means of a pin 44, and its front end received between the ear members 35 and pivotally connected therewith by means of a pin 45, and 46 represents a diagonally disposed draft frame brace member connecting the front end of the bar 38 with the rear end of the bar 42. 47 represents a supplemental draft bar having its rear end received between ear members 48 integral with the joint plate 14 and pivotally connected therewith by means of a pin 49, and its front end detachably connected with a tractor axle extension 50.

The harvester frame is adapted to be tilted about the axis of the pin connections 40, 44 and 49, and 51 represents a vertically disposed guide integral with the joint plate 15 and formed concentric with the axis of tilt of the harvester. 52 represents a complemental guide secured to the bar 47 and overlapping the guide 51 in a manner to retain the harvester in proper relation with the tractor that otherwise might be changed by side draft conditions. Means for tilting the harvester include a toothed sector 53 carried at the front end of the bar 47, a hand lever 54 pivoted upon and concentric with the sector and provided with a common form of spring pressed detent mechanism 55 that engages with the toothed sector in a manner to secure the lever in any desired position of adjustment, a forwardly and laterally extending arm 56 at the lower end of the lever, and a link connection between the free end of the arm and the bracket member 57 secured to the frame members 2 and 5.

Means for adjusting the harvester attachment to variable heights from the ground include means for swinging the grain wheel supporting arm 9 about its axis that preferably are the same as is shown in my Patent No. 728,199, dated May 19, 1903, and 58 represents a lever pivoted upon a stud 59 secured to the L-shaped frame member 36 and provided with a toothed sector 60 adapted to operatively engage with a worm gear member 61 secured to a longitudinally disposed shaft 62 journaled in bearings 63 carried by the frame member 36 and provided with a crank member 64. The free end of the lever 58 extends rearward and is connected with the rear end of the draft bar 38 by means of a link 65 whereby the operator may, by manipulating the crank member 64, raise or lower the rear end of the draft frame, carrying with it the harvester attachment.

The power transmission gearing of the tractor is preferably of the form shown in my application for patent filed September 22, 1915, Serial No. 52,098, and includes a planetary gear mechanism, of which a rotatable casing 66 mounted upon the engine shaft 31 forms a part, and 67 represents a sprocket carrying sleeve, operatively connected with the traction wheels by means of the chain 33. 68 represents a countershaft journaled in bearings carried by the truck frame of the tractor, disposed parallel with and below the engine shaft 31, and journaled thereon is a gear member 69 that is operatively connected with a gear member 70 carried by the sleeve 67 by means of an intermediate pinion 71. The gear member 69 is controlled by a clutch mechanism having any desired form and operative to cause it to transmit motion to the countershaft at the will of the operator and controllable as by means of a clutch shipping member 72 within convenient reach of the operator. 73 represents a bevel pinion secured to the end of the countershaft and meshing with a similar pinion 74 secured to the front end of a longitudinally disposed shaft 75 journaled in a bearing box 76, having integral therewith an arm 77 whereby it is pivoted upon the shaft in a detachable manner. 78 represents a bearing box having a similar arm whereby it is pivotally and detachably connected with the stubbleward end of the shaft 23, and 79 is a bevel pinion having a sleeve member 80 journaled in the bearing box 78 and connected with the rear end of the shaft 75 by means of a spline 81 whereby the shaft is permitted to slide longitudinally in the sleeve as the harvester is tilted or adjusted in varying planes. The pinion 79 meshes with a corresponding pinion 82 secured to the stubbleward end of the shaft 23, and thereby motion is transmitted from the tractor gearing to the operative parts of the harvester and controllable by the operator from his seat upon the tractor. The harvester may be easily connected with or detached from the tractor, and its position being at the grainward side of the tractor with the gathering prongs extending in front of the tractor, its operative parts are within full view of the operator.

By means of the transmission above set forth the operative parts of the harvester may be actuated from the power shaft of the engine of the tractor whether or not the tractor is being propelled.

Having shown and described a preferable embodiment of my invention, I do not wish that it be confined to the specific details of its construction as illustrated, it being understood that many changes may be made in form and disposition of the parts without departing from the spirit of my invention.

What I claim as my invention, and desire to secure by Letters Patent, is:

1. In combination, a tractor including a wheel supported frame, a corn harvester including a harvester frame, a plurality of draft members connected to said tractor frame and to the stubbleward side of said frame and whereby the stubbleward harvester frame whereby the stubbleward side of said harvester frame is entirely supported on said tractor frame, and means carried by said draft members for tilting said harvester frame on its axis.

2. A tractor operated corn harvester including, in combination, a harvester frame, draft connections whereby said frame may be detachably connected with the tractor, means carried by said draft connections and operative to raise or lower said frame relative to the tractor, said means including a lever carried by one end of said draft connections and provided with a toothed sector, a crank operated worm engaging with said sector, and a link connection between the free arm of said lever and the opposite end of said draft connections.

3. A tractor operated corn harvester including, in combination, a harvester frame disposed at one side of the tractor, a draft member pivotally connecting said frame with the tractor, means for tilting said frame relative to the tractor, and slidable engaging attachments carried by said draft member and said frame for resisting a lateral displacement of said frame relative to the tractor.

4. A tractor operated corn harvester including, in combination, a harvester frame having a transversely disposed member in rear of the truck frame of the tractor, forwardly extending gathering prongs disposed at one side thereof, draft members having their front ends pivotally connected with the tractor and their rear ends with said transverse frame member, means for tilting said frame about its axis of connection with said draft members, a curved guide carried by said frame in front of its axis of tilt, and a corresponding curved guide carried by one of said draft members and overlapping said first guide in a manner to hold said frame against lateral swing relative to the tractor.

5. In combination, a tractor having a wheel supported frame, a harvester including a harvester frame, a plurality of members pivotally connected to said tractor frame and connected to the stubbleward side of said harvester whereby the stubbleward side of said harvester frame will be entirely supported on said tractor frame, and mechanism connected to said connecting members for changing the relative positions of said harvester frame and said tractor frame.

6. A tractor operated harvester including, in combination, a harvester frame, means for connecting said frame to the tractor, tilting means for said frame, and supplemental means coöperating with said connecting means and said tilting means to hold the harvester against lateral swing relative to the tractor.

In testimony whereof I affix my signature.

EDWARD W. BURGESS.